(12) United States Patent
Kohn et al.

(10) Patent No.: US 7,138,585 B2
(45) Date of Patent: Nov. 21, 2006

(54) SCALE WITH MESSAGE DISPLAY

(75) Inventors: Gabriel Kohn, Boca Raton, FL (US); Alejandro Herrera, Boca Raton, FL (US); Anson Wong, Boca Raton, FL (US); Patricia Bassett, Boca Raton, FL (US)

(73) Assignee: Sunbeam Products, Inc, Boca Raton, FL (US)

( * ) Notice: Subject to any disclaimer, the term of this patent is extended or adjusted under 35 U.S.C. 154(b) by 227 days.

(21) Appl. No.: 10/431,837

(22) Filed: May 7, 2003

(65) Prior Publication Data

US 2004/0222026 A1    Nov. 11, 2004

(51) Int. Cl.
*G01G 23/01* (2006.01)
*G01G 23/36* (2006.01)

(52) U.S. Cl. .................. 177/25.13; 702/101; 73/1.13

(58) Field of Classification Search ............... 73/1.13; 702/101–102; 177/25.11–25.17, 25.19
See application file for complete search history.

(56) References Cited

U.S. PATENT DOCUMENTS

| | | | |
|---|---|---|---|
| 3,358,784 A | 12/1967 | Weickhardt | 177/169 |
| 4,313,510 A * | 2/1982 | Tomlinson, Jr. | 177/165 |
| 4,325,441 A | 4/1982 | Nakatani et al. | 177/25.13 |
| 4,366,873 A * | 1/1983 | Levy et al. | 177/25.19 |
| 4,576,244 A | 3/1986 | Zeigner et al. | 177/245 |
| 4,650,015 A * | 3/1987 | Carnevale et al. | 177/211 |
| 4,661,920 A | 4/1987 | Haze | 702/101 |
| 4,723,613 A | 2/1988 | Garlen et al. | 177/50 |
| 4,751,661 A * | 6/1988 | Amacher et al. | 702/87 |
| 4,814,995 A * | 3/1989 | Daniels, Jr. | 705/402 |
| 4,848,477 A * | 7/1989 | Oldendorf et al. | 177/25.14 |
| 5,017,916 A | 5/1991 | Londt et al. | 340/870.13 |
| 5,270,494 A * | 12/1993 | Davis et al. | 177/25.14 |
| 5,307,281 A * | 4/1994 | Wollmann | 705/407 |
| 5,327,117 A | 7/1994 | Kohsaka | 340/525 |
| 5,545,855 A | 8/1996 | Stanfield et al. | 177/25.13 |
| 5,578,797 A * | 11/1996 | Hewitt et al. | 177/5 |
| 5,610,373 A * | 3/1997 | Graves et al. | 177/50 |
| 5,832,417 A * | 11/1998 | Petrucelli et al. | 702/101 |
| 6,091,326 A | 7/2000 | Castellano | 340/457.4 |
| 6,290,646 B1 * | 9/2001 | Cosentino et al. | 600/300 |
| 6,400,358 B1 | 6/2002 | Carter | 345/169 |
| 6,674,019 B1 * | 1/2004 | Oldendorf et al. | 177/25.13 |
| 6,838,624 B1 * | 1/2005 | Chan | 177/50 |
| 6,989,494 B1 * | 1/2006 | Yagioka et al. | 177/25.13 |

* cited by examiner

*Primary Examiner*—Randy W. Gibson
(74) *Attorney, Agent, or Firm*—Lawrence J. Shurupoff

(57) ABSTRACT

Disclosed is a bath scale for measuring a user's weight having a weight display and a message display driven by a detection-and-display system adapted to provide through the message display one or more substantially non-deductive messages to the user of the bath scale that instruct the user in plain language how to use the scale.

15 Claims, 3 Drawing Sheets

SCALE WITH MESSAGE DISPLAY

BACKGROUND OF THE INVENTION

1. Field of the Invention

This invention relates to bath scales with instructional displays.

2. Discussion of Related Art

It is well known in the art of electronic bath scales to provide a scale with a digital numeric display. Typically, these scales are first calibrated by having the user tap the top of the scale with one's foot, thereby initiating a calibration operation within the circuitry of the scale. The calibration operation typically takes several seconds before a numeric "0" appears on the scale's weight indicator to indicate the calibration is complete. Usually, some abstract signal is provided to the user to indicate the calibration procedure is in progress, such as flashing numeric "8"s or "-"s across the display. When the calibration is complete and the "0" appears, the user may then step upon the scale for a weight measurement.

Many users of such electronic bath scales tap the scale with their foot to initiate the calibration operation, but then go ahead and stand upon the scale before the calibration is complete. When this happens, the scale typically generates an error signal or simply reads "0". The user, rather than reading the instructions to determine what the problem is, often simply returns the product as defective, even though it is perfectly functional. Processing such returns adds to the cost of the product.

Typically, the problem is that the user is untrained with respect to the product. This is in contrast to trained users of various weight balance systems. For example, U.S. Pat. No. 4,723,613, issued Feb. 9, 1988, to Garlen et al., discloses a professional table scale that displays the abstract text "C Lbs" during the calibration procedure to indicate to the user that a calibration operation is in progress. The balance has a number of control buttons to allow a user to print out the results to a computer or printer, changing the units of measurement, subtract the weight of empty containers, and zero the balance. Such a complicated balance is adapted for the use of a sophisticated user who has read the instructions in detail or has been trained to use the device and who would therefore know the significance of "C Lbs", namely that (a) the abstract display indicates that a calibration is in progress and that (b) therefore no weight should be put on the scale. Hence, the user is burdened with a two-step logical inference from the abstract information displayed in order to use the device properly.

Much of the other prior art requires a multiple step logical deduction on the part of the user to determine that there is a zeroing problem. Typically, these systems indicate to the user that there is something wrong with the zeroing of the scale, but gives no indication of why. U.S. Pat. No. 4,325,441, issued Apr. 20, 1982, to Nakatani et al. has a voice synthesizer that announces the words "ZERO CENTER" to indicate the scale is not properly zeroed. From this, the user must deduce (a) that the scale is not zeroed, (b) a calibration procedure must be initiated, and that (c) the object to be weighed must be removed form the scale during the calibration. This series of deductions is generally beyond the capabilities of an untrained and uninformed user of a household bath scale.

Another problem in the art of electronic bath scales is dead batteries. Numerous consumers return scales as defective when the batteries die. Again, this is a failure of indicating the problem to the user without resort to written instructions or training.

What is needed for the casual household user is a substantially zero-step deduction message system. In other words, a bath scale that explicitly instructs the user to properly use the scale without the need for any logical deduction on the part of the user, irrespective of whether the user has read the instructions for the scale.

SUMMARY OF THE INVENTION

Disclosed is a bath scale for measuring a user's weight, comprising a standing surface upon which the user stands to have one's weight measured, a weight display, a message display, and a detection-and-display system adapted to provide through the message display one or more substantially non-deductive messages to the user of the bath scale. Information provided on the message display may relate to the condition of the scale, to the user's weight or to any other message desired, such as diet information or encouragement messages relating to weight loss.

In another aspect of the apparatus, the weight display and the message display share common display elements.

In another aspect of the apparatus, the message display is an LCD display.

In another aspect of the apparatus, the detection-and-display system provides a message, in text, to the user to step off the scale during a calibration operation.

Another aspect of the apparatus further comprises a battery power source, wherein the detection-and-display system is adapted to test the battery power source, and wherein the detection-and-display system provides a substantially non-deductive message to the user to replace or recharge the battery power source when indicated.

In another aspect of the apparatus, the detection-and-display system provides a substantially non-deductive message to the user that the weight placed upon the scale is out of the range of the scale's capabilities.

In another aspect of the apparatus, the non-deductive text message is also provided as audible speech through a speaker.

In another aspect of the apparatus, the non-deductive message is scrolled across the message display in printed text.

Disclosed is a program storage device readable by a machine, tangibly embodying a program of instructions executable by the machine to perform method steps for aiding a user to operate a scale, the method steps comprising detecting a load upon the scale, checking the calibration of the scale, and if the calibration check shows the scale to be properly calibrated, then measuring the load, otherwise executing a calibration of the scale and displaying a substantially non-deductive message to the user to remove the detected load from the scale.

Another aspect of the program storage device further comprises the step of delaying execution of the calibration until removal of the load is detected.

Another aspect of the program storage device further comprises the steps of checking the strength of a battery power source, and displaying a substantially non-deductive message to the user to replace or recharge the battery power source if the battery check so indicates.

Another aspect of the program storage device further comprises the steps of checking that the load is within the range of capabilities of the scale to measure, and displaying a substantially non-deductive message to the user that the load is outside the range of the scale's capabilities if the range check so indicates.

Another aspect of the program storage device further comprises the step of delivering the non-deductive message to remove the load from the scale as audible speech through a speaker.

Another aspect of the program storage device further comprises the step of delivering the non-deductive message to recharge or replace the battery power source as audible speech through a speaker.

Another aspect of the program storage device further comprises the step of delivering the non-deductive message that the load is outside the range of the scale's capabilities as audible speech through a speaker.

Disclosed is a bath scale for measuring a user's weight, comprising weight display means for displaying a measured load, message display means for displaying non-deductive instructions or other messages to the user, one or more sensor means for sensing data, including one or more load sensor means for detecting and measuring a load upon the bath scale, and detection-and-display means for inputting and processing information from the sensor means and outputting the non-deductive messages to the user.

In another aspect of the bath scale, the detection-and-display means further comprises means for determining when the scale is in need of calibration, means for outputting a substantially non-deductive message to the user to remove the load from the scale, and means for executing a calibration.

In another aspect of the bath scale, the detection-and-display means further comprises means for determining when a battery power source means of the scale is in need of recharging or replacement, and means for outputting a substantially non-deductive message to the user to replace or recharge the battery power source means.

In another aspect of the bath scale, the detection-and-display means further comprises means for determining when the load is outside the range of measurement of the scale, and means for outputting a substantially non-deductive message to the user that the load is outside the scale's range.

Another aspect of the bath scale further comprises means of outputting the non-deductive message as audible speech.

DETAILED DESCRIPTION OF PREFERRED EMBODIMENTS

Figure 1:
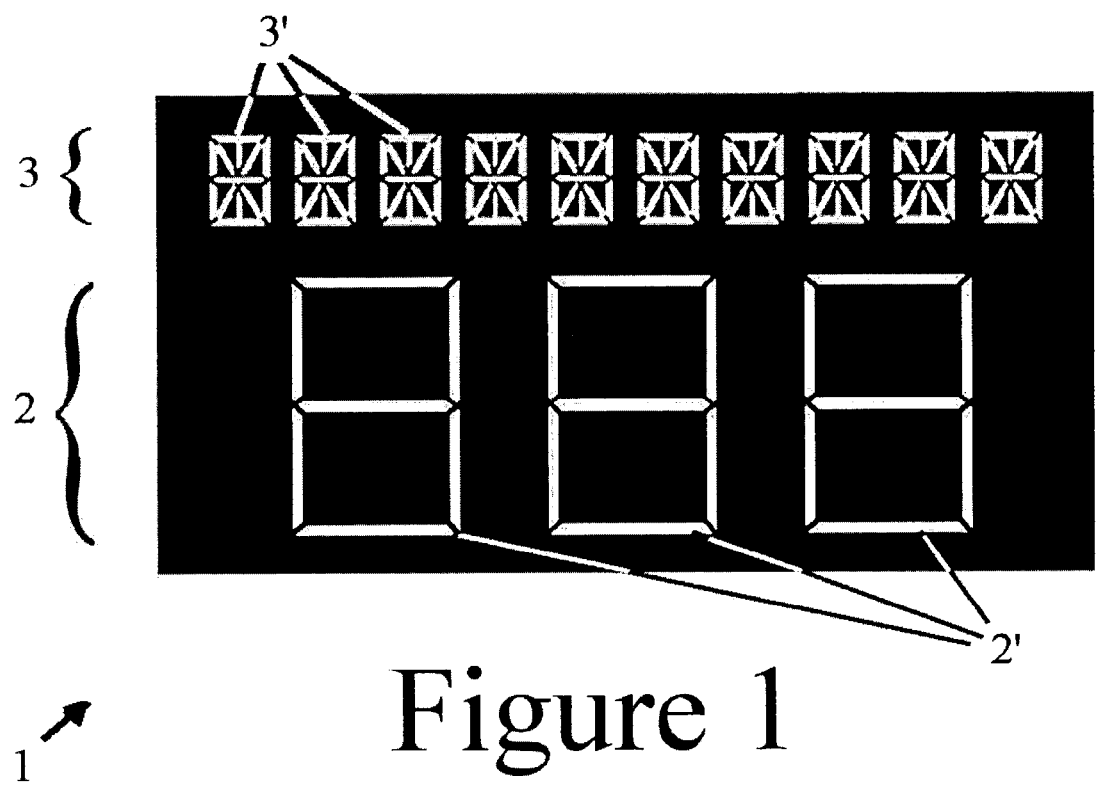
FIG. 1 shows an embodiment of a message and weight display.
Figure 2:
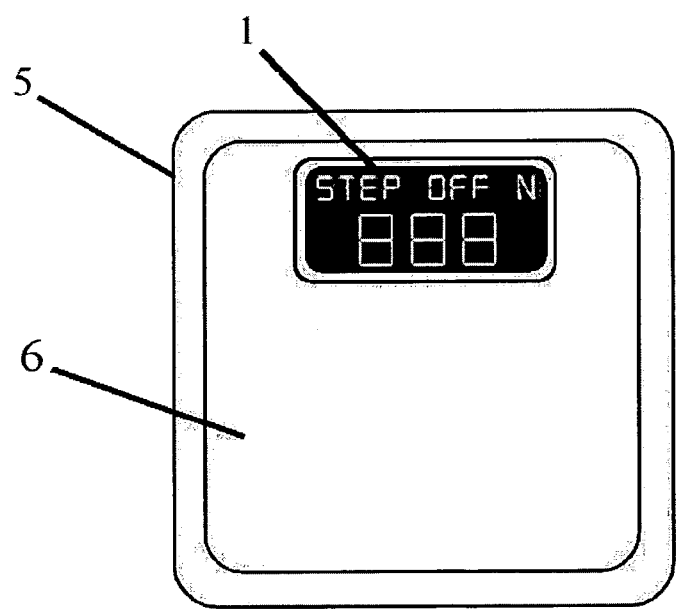
FIG. 2 shows a typical bath scale fitted with the display of the invention.

Referring to FIGS. 1 and 2, there is shown one embodiment of a message and weight display 1 of the invention. In the embodiment as shown, the display comprises separate weight 2 and message 3 displays, each comprising a plurality of weight display elements 2' and message display elements 3' that thereby permit simultaneous display of numeric messages and alphanumeric data, respectively, though one may opt for a sharing of display elements for both messages and weight to reduce cost at the expense of convenience. The message and weight display 1 may be a typical segment-type LED display, an LCD display, or any other display suitable to the purpose. The weight and message displays do not need to be integrated on the same circuit board, but rather may be separately fabricated and mounted. Some models of bath scales are also equipped to display the percentage of the user's body fat, which may also be displayed through the weight display 2.

FIG. 2 shows the display in action on a bath scale 5 having a standing surface 6 upon which the user stands to be weighed. As can be seen in the drawing, a preferred embodiment of the message display 3 is a scrolling or marquee-type display that rolls the message across from right to left. Scrolling is preferred because it allows longer and clearer natural-language messages to be displayed to the user and thereby avoids the need to "abstract" or truncate messages in a way that the user might not understand. In this case the message "PLEASE STEP OFF NOW DURING CALIBRATION" is scrolling across the message display 3 while the weight display 2 simply flashes "888" (or whatever other display is desired in the weight display 2 to indicate a calibration is in progress). Where the message is wider than the display, it is preferred that the message scroll repeatedly so as to ensure the user gets the whole message. Of course, the direction of scrolling and orientation of the message display 3 depend upon the direction in which words are read in the language displayed.

Note that the size of the message elements 3' of the message display 3 will generally be smaller than the size of those of the weight display 2. In general, the message display elements will be about 0.25 inches wide and 0.5 inches high. As an option, a voice synthesizer may be included in the invention to speak out the message as it scrolls so as to accommodate those users who are visually impaired. It is preferred in such cases to have a switch or means for shutting off this feature because many consumers are annoyed by "talking" appliances.

Figure 3:
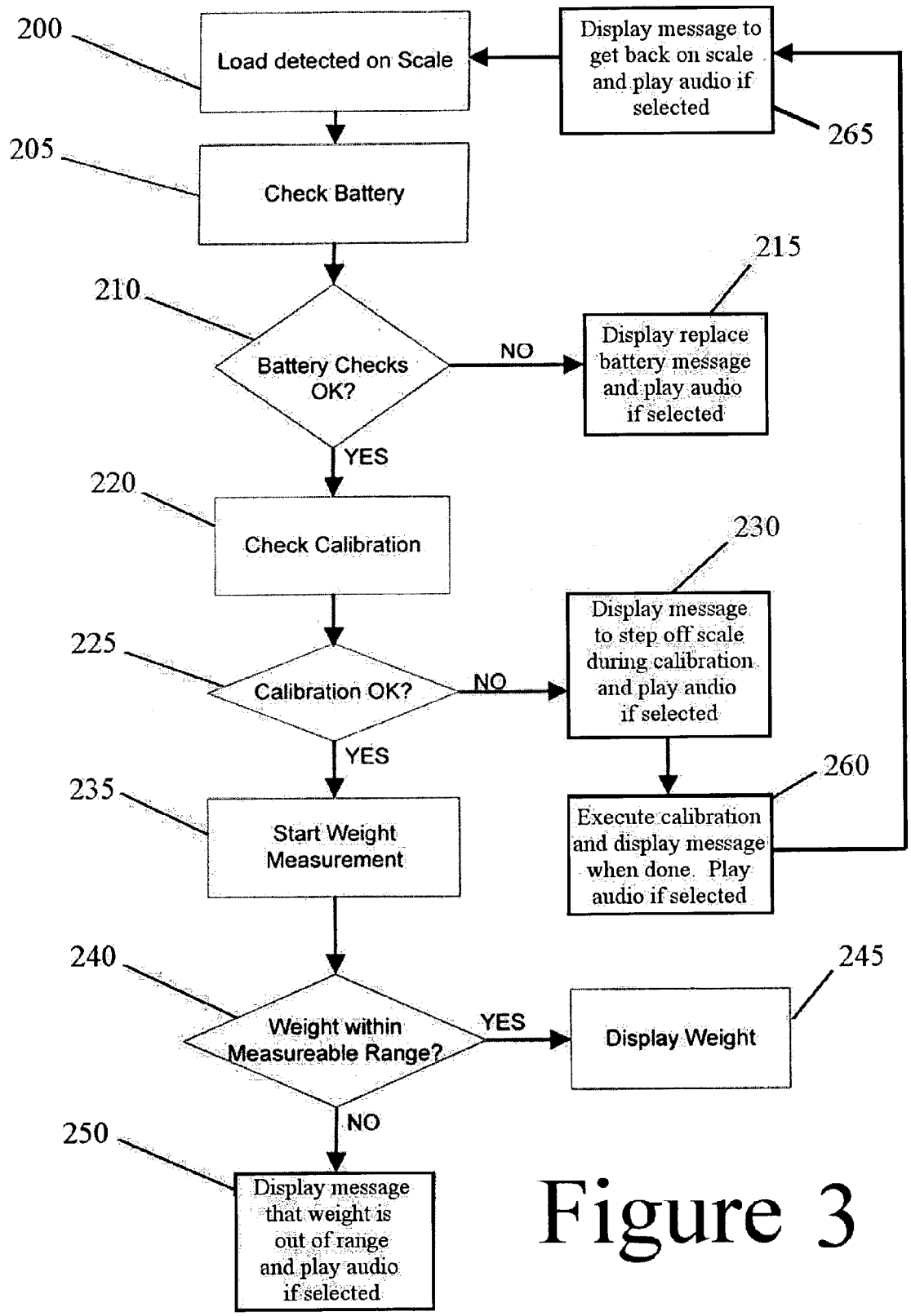
FIG. 3 shows a flowchart of an embodiment of the invention.

Referring to FIG. 3, there is shown a flowchart for a detection-and-display system of the bath scale. Starting at node 200, a load event is detected, indicating a load has been placed upon the scale. This corresponds to either the foot tap used to initiate typical electronic bath scales or the act of stepping upon the scale after calibration to read the user's weight.

Next, an optional battery check procedure is preferably included. The battery power source strength is checked at node 205. If the battery is dying, control flows to node 215 where a message is displayed instructing the user that the battery power source must be replaced or recharged (e.g., THE BATTERY IS LOW AND MUST BE REPLACED). The message may also instruct the user to flip the scale over, or whatever actions must be taken, to replace or recharge the battery power source. If an audio system is installed, the audio version of the message is played if the audio option has been selected by the user.

If the battery power is found to be sufficient, control flows through decision node 210 to node 220, where the calibration of the scale is checked. If the scale is not calibrated, control flows to node 230 where a message is generated to the user to get off the scale (e.g., PLEASE STEP OFF NOW DURING THE CALIBRATION). The calibration procedure is then executed at node 260. In a preferred embodiment, the calibration procedure is not executed until an unload event is detected indicating the user has stepped off the scale. A message may be displayed informing the user when the calibration is completed (e.g., THE CALIBRATION IS COMPLETE), though this is optional. Flow then goes to node 265 where a message is displayed instructing the user to get back on the scale (e.g., PLEASE STEP BACK ON THE SCALE TO BE WEIGHED).

If the scale is detected to be already calibrated at nodes 200 and 225, then this indicates that the calibration has already been completed and that the load event detected at node 200 is the user now stepping back upon the scale to be weighed. Control now flows to node 235 where the weight of the user is measured. If the weight is not within the measurable range of the scale (such as when a user attempts to use the scale to weigh an object much heavier than a human), control flows to node 250 where a message is displayed explain the problem to the user (e.g., THAT OBJECT IS TOO HEAVY TO BE WEIGHED BY THIS SCALE). Otherwise, control flows through decision node 240 to node 245 where the numerical weight is displayed on the weight display (labeled "2" in FIG. 1).

As indicated earlier, preferred messages are non-deductive, meaning plain language instructions telling the user exactly what to do and what is going on without supplemental information, such as from a instruction manuals or instructional training. Note that a message may be plain language without being non-deductive. "NOW CALIBRATING" is plain language, yet requires a plurality of deductive steps to figure out the user must step off the scale.

Some instructions have become substantially non-deductive through common usage. The most common of these is "BATTERY LOW," which is plain language though not inherently non-deductive, yet has become commonly known to mean that the battery must and can be replaced. Hence, "BATTERY LOW" and the like may be considered substantially non-deductive for the purposes of this invention, but not necessarily preferred because a small percentage of consumers will nevertheless fail to grasp that the battery must or can be replaced by the consumer and will send in the unit for servicing.

Figure 4:
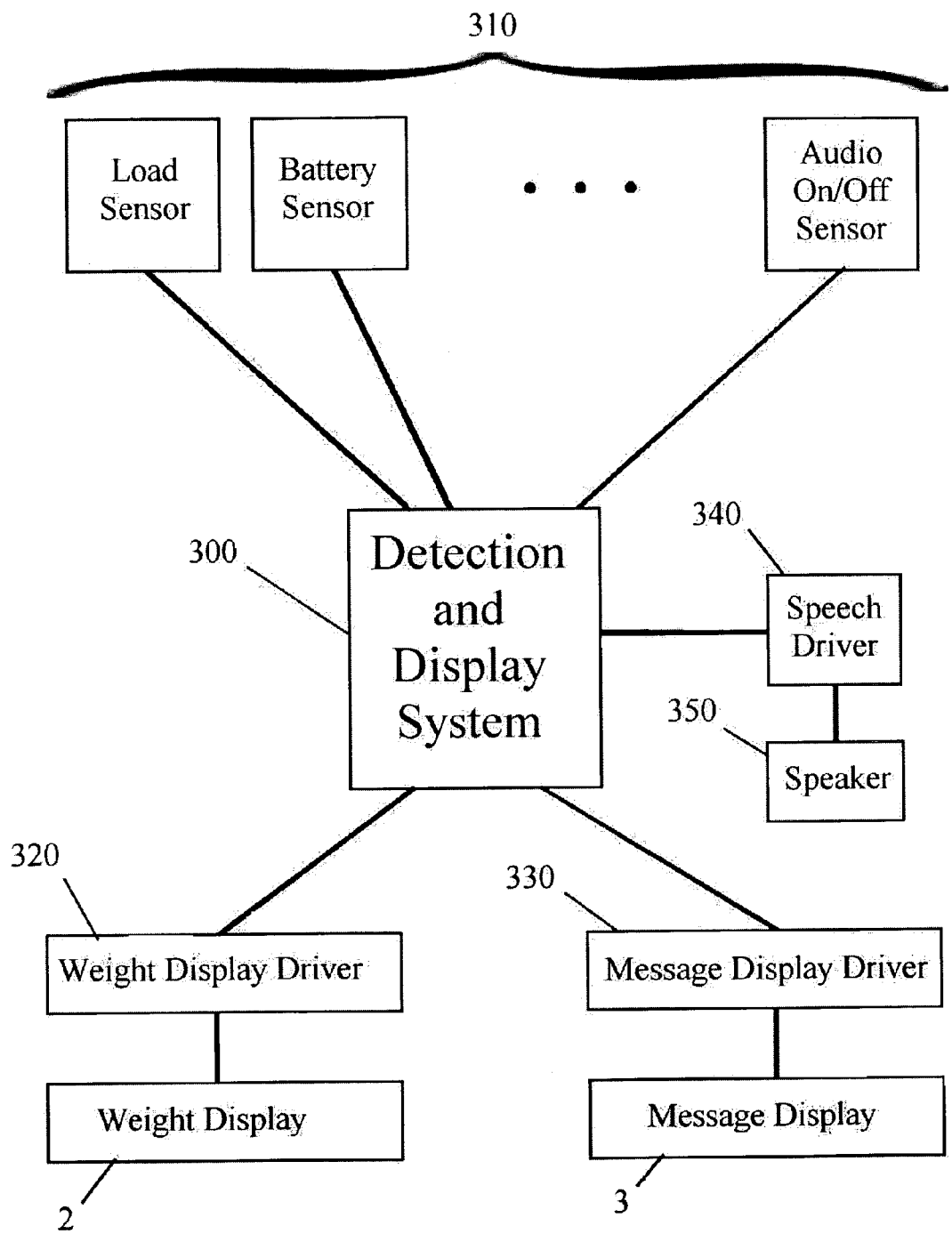
FIG. 4 shows an embodiment of the architecture of the invention.

Referring to FIG. 4, the flowchart of FIG. 3 or its equivalents may be executed by a detection-and-display system 300 comprising any device capable of executing a set of instructions, such as a microprocessor in combination with the needed sensors 310, weight 320 and message 330 display drivers (and optional audio speech driver 340 to drive a speaker 350). The instructions will typically be in the form of a computer-executable set of instructions tangibly embodied in a storage device comprising a computer usable medium. Sensors may include, among others, load sensors for detecting load events, load (i.e., weight), unload events, and battery voltage. The means for detecting that the load on the scale is out of range may include a physical sensor or, more preferably, by simply storing the maximum weight on a memory medium or making the maximum weight available to a data bus with a DIP switch (and therefore manually programmable). As stated earlier, the user's choice of activating an optional audio system may be effected with a switch, preferably located on the bottom of the scale where it will be out of the way, and which serves as an audio on/off sensor.

While various values, scalar and otherwise, may be disclosed herein, it is to be understood that these are not exact values, but rather to be interpreted as "about" such values, Further, the use of a modifier such as "about" or "approximately" in this specification with respect to any value is not to imply that the absence of such a modifier with respect to another value indicated the latter to be exact.

Changes and modifications can be made by those skilled in the art to the embodiments as disclosed herein and such examples, illustrations, and theories are for explanatory purposes and are not intended to limit the scope of the claims. Further, the abstract of this disclosure is provided for the sole purpose of complying with the rules requiring an abstract so as to allow a searcher or other reader to quickly ascertain the subject matter of the disclosures contained herein and is submitted with the express understanding that it will not be used to interpret or to limit the scope or the meaning of the claims.

What is claimed is:

1. A bath scale for measuring a user's weight, comprising:
    a standing surface upon which the user stands to have his weight measured;
    a weight display;
    a message display; and
    a detection-and-display system adapted to provide through said message display one or more substantially non-deductive messages to the user of said bath scale, said messages instructing the user as to how to calibrate and use the scale including a message to step off said scale during a calibration operation.

2. The apparatus of claim 1 wherein said weight display and said message display share common display elements.

3. The apparatus of claim 1 wherein said message display is an LCD display.

4. The apparatus of claim 1 further comprising:
    a battery power source;
    wherein said detection-and-display system is adapted to test said battery power source; and
    wherein said detection-and-display system provides a substantially non-deductive message to the user to replace or recharge said battery power source when indicated.

5. The apparatus of claim 1 wherein said detection-and-display system provides a substantially non-deductive message to the user that the weight placed upon the scale is out of the range of the scale's capabilities.

6. The apparatus of claim 1 wherein said non-deductive message is also provided as audible speech through a speaker.

7. The apparatus of claim 1 wherein said non-deductive message is scrolled across said message display.

8. A program storage device readable by a machine, tangibly embodying a program of instructions executable by the machine to perform method steps for aiding a user to operate a scale, said method steps comprising:
    detecting a load upon said scale;
    checking the calibration of said scale; and
    if said calibration check shows the scale to be properly calibrated, then measuring said load, otherwise:
    executing a calibration of said scale and displaying a substantially non-deductive language message to the user to remove the detected load from the scale.

9. The program storage device of claim 8 further comprising the step of:
    delaying execution of said calibration until removal of said load is detected.

10. The program storage device of claim 8 further comprising the steps of:
    checking the strength of a battery power source; and
    displaying a substantially non-deductive language message to the user to replace or recharge said battery power source if said battery check so indicates.

11. The program storage device of claim 8 further comprising the steps of:
   checking that said load is within the range of capabilities of the scale to measure; and
   displaying a substantially non-deductive language message to the user that said load is outside the range of the scale's capabilities if said range check so indicates.

12. The program storage device of claim 9 further comprising the step of delivering said non-deductive language message to remove the load from the scale as audible speech through a speaker.

13. The program storage device of claim 10 further comprising the step of delivering said non-deductive language message to recharge or replace said battery power source as audible speech through a speaker.

14. The program storage device of claim 11 further comprising the step of delivering said non-deductive language message that said load is outside the range of the scale's capabilities as audible speech through a speaker.

15. A bath scale for measuring a user's weight, comprising:
   a standing surface;
   a weight display adapted to provide a user's weight in numeric form;
   a message display spaced apart and separate from said weight display and adapted to provide across said message display a scrolled message displayed as a non-deductive language message readable by a user;
   said weight display comprising a plurality of numeric weight display elements;
   said message display comprising a plurality of alphanumeric message display elements; and
   said message display elements having a size smaller than said weight display elements, and wherein said message display elements are greater in number than said weight display elements.

* * * * *